(12) United States Patent
Lassus et al.

(10) Patent No.: US 7,984,873 B2
(45) Date of Patent: Jul. 26, 2011

(54) RETRACTION CYLINDER AND ROTORCRAFT UNDERCARRIAGE FURNISHED WITH SUCH A RETRACTION CYLINDER

(75) Inventors: Vincent Lassus, Marseilles (FR); Benjamin Talon, Cahors (FR)

(73) Assignee: Eurocopter (FR)

( * ) Notice: Subject to any disclaimer, the term of this patent is extended or adjusted under 35 U.S.C. 154(b) by 483 days.

(21) Appl. No.: 12/248,410

(22) Filed: Oct. 9, 2008

(65) Prior Publication Data

US 2009/0095839 A1    Apr. 16, 2009

(30) Foreign Application Priority Data

Oct. 11, 2007 (FR) ...................... 07 07129

(51) Int. Cl.
*B64C 25/22* (2006.01)

(52) U.S. Cl. ............ 244/104 FP; 244/102 A; 244/102 R

(58) Field of Classification Search .............. 244/100 R, 244/102 R, 102 SS, 102 A, 104 FP
See application file for complete search history.

(56) References Cited

U.S. PATENT DOCUMENTS

| | | | | |
|---|---|---|---|---|
| 4,907,760 A * | 3/1990 | Sealey et al. | .............. | 244/100 R |
| 5,337,976 A | 8/1994 | Derrien | | |
| 6,059,228 A * | 5/2000 | Koizumi et al. | .......... | 244/102 R |
| 6,676,076 B1 * | 1/2004 | Davies | ...................... | 244/102 R |
| 7,720,582 B2 * | 5/2010 | Makinadjian | ................... | 701/37 |
| 2008/0111022 A1 * | 5/2008 | Lahargou et al. | ......... | 244/100 R |
| 2010/0187353 A1 * | 7/2010 | Masson et al. | .......... | 244/104 FP |

FOREIGN PATENT DOCUMENTS

FR    2687123    8/1993

OTHER PUBLICATIONS

Search Report of Jun. 24, 2008, in French priority application.

* cited by examiner

*Primary Examiner* — Tien Dinh
*Assistant Examiner* — Keith Dixon
(74) *Attorney, Agent, or Firm* — Brooks Kushman P.C.

(57) ABSTRACT

A retraction cylinder (20) makes it possible to retract a leg (10) of a rotorcraft landing gear, the retraction cylinder (20) comprising a retraction chamber (33) and an extension chamber (34) separated by a head (26) of a piston (25), the piston (25) sliding in a cylindrical sheath (35). In addition, the retraction cylinder (20) comprises a return element (23) and a control chamber (22) furnished with a first fluid, this control chamber (22) being separated from the return element (23) by a movable release member (24), the movable release member (24) sliding so that the retraction cylinder (20) fulfils a damping function when a control pressure exerted by the first fluid on the movable release member (24) is greater than a return pressure exerted by the return element (23).

18 Claims, 2 Drawing Sheets

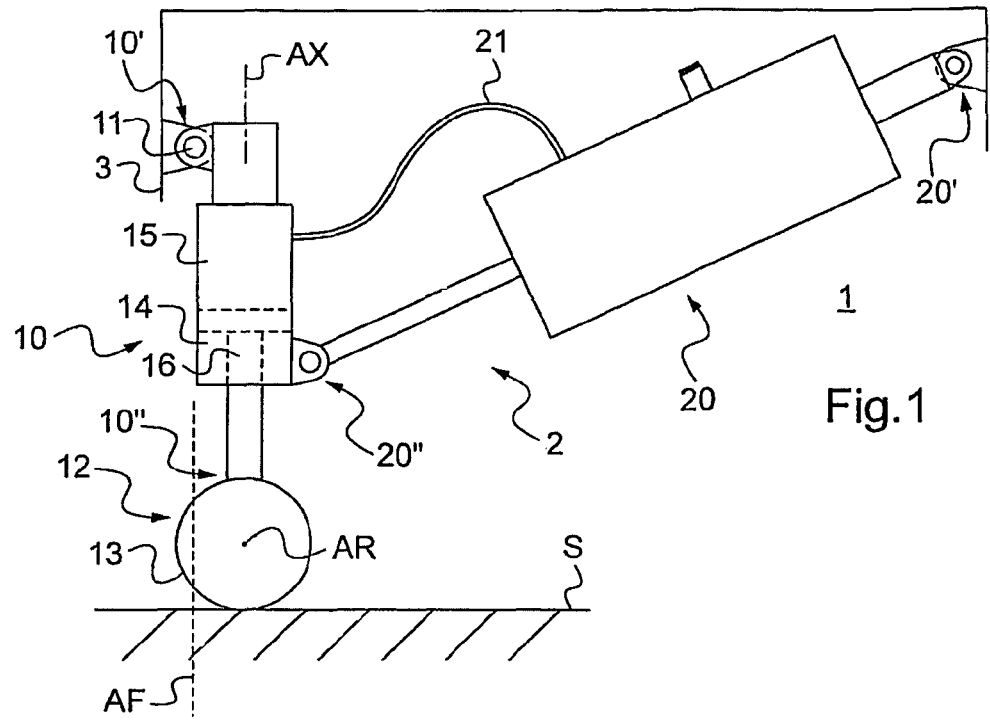
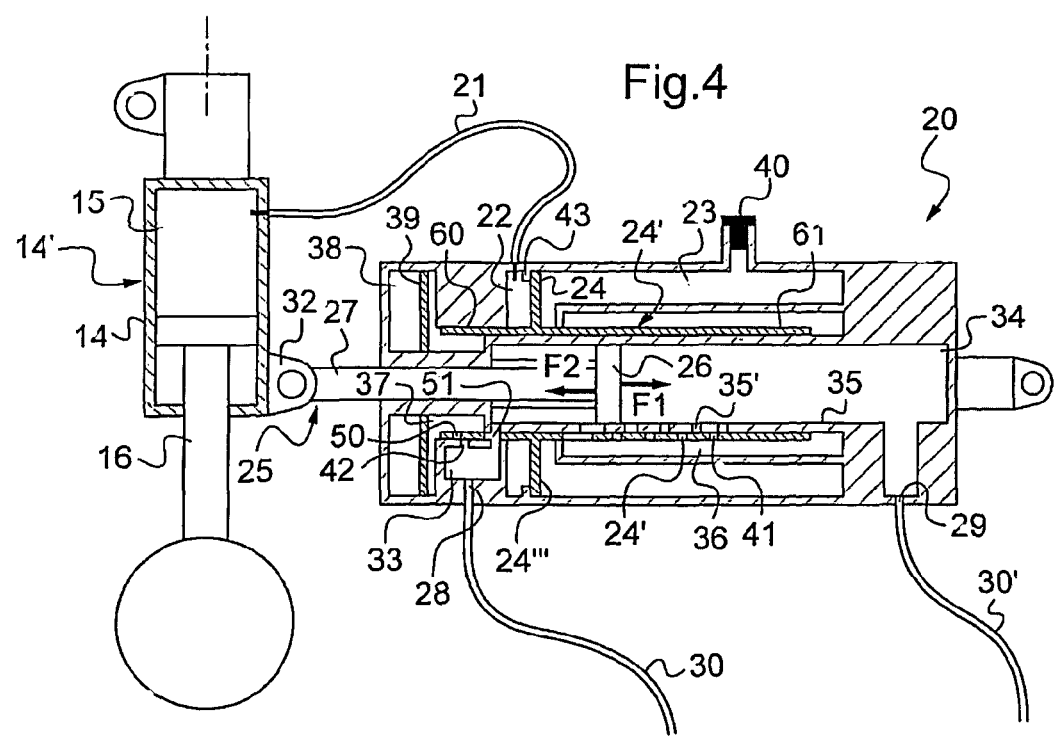

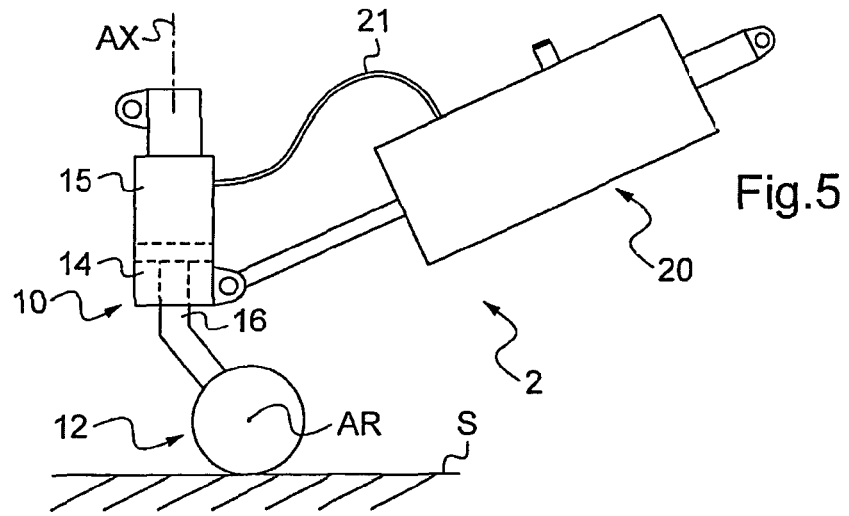
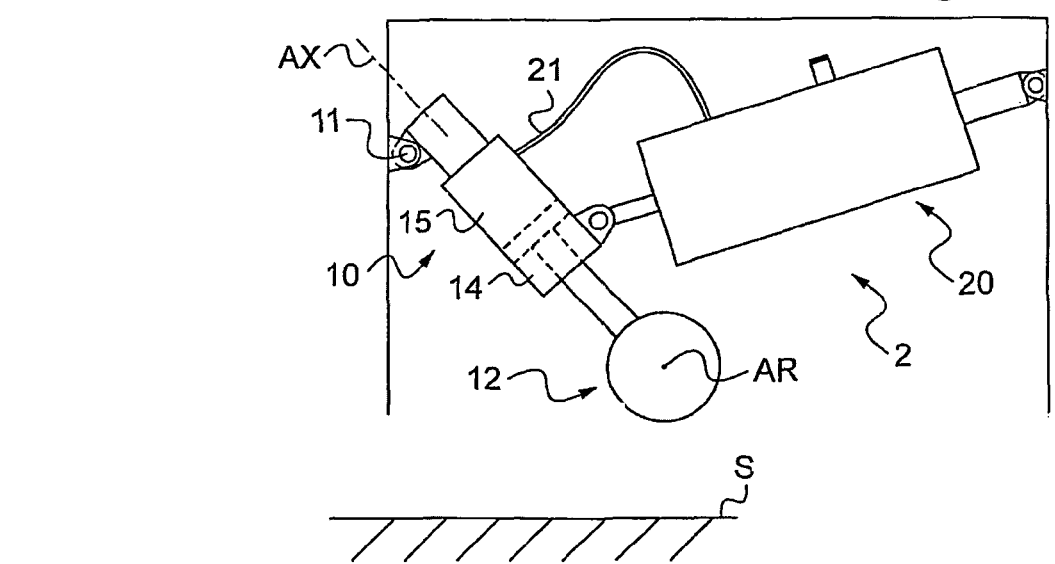
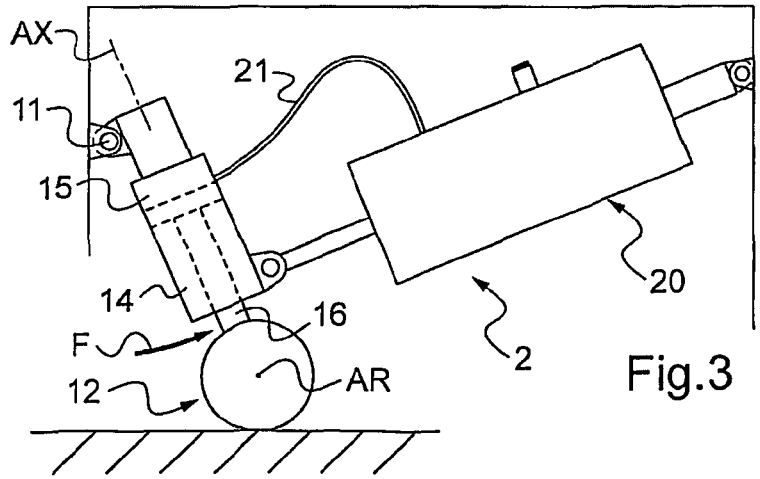

RETRACTION CYLINDER AND ROTORCRAFT UNDERCARRIAGE FURNISHED WITH SUCH A RETRACTION CYLINDER

The present invention relates to a retraction cylinder and a rotorcraft undercarriage fitted with such a cylinder, an undercarriage being called "landing gear" by those skilled in the art.

The invention is therefore situated in the field of rotorcraft landing gears.

BACKGROUND OF THE INVENTION

A first type of undercarriage is known, called "rocker-beam undercarriage" furnished with an undercarriage leg attached to the structure of the rotorcraft via an attachment, in order to be able to make a rotary movement about this attachment.

This landing gear leg comprises a damper and a running assembly provided with at least one wheel.

Furthermore, the undercarriage has a retraction cylinder sometimes called "stay rod cylinder" by those skilled in the art.

The purpose of the retraction cylinder is therefore to retract the undercarriage in order to take it into a compartment of the rotorcraft when the latter is flying or in order to take it out of this compartment during landing, causing the landing gear leg to pivot about its attachment.

In addition, the retraction cylinder is sometimes stressed horizontally, namely in a direction substantially parallel to the ground, in order to keep the landing gear leg out when the rotorcraft runs on the ground.

More precisely, the retraction cylinder keeps the landing gear leg out irrespective of the obstacles, a stone, for example, encountered by the rolling assembly of the undercarriage.

Conversely, the damper is stressed only vertically because the function of this damper is to damp the impacts applied to the undercarriage during a landing.

Consequently, the undercarriage is conventionally fitted with a damper stressed only by vertical impacts. In addition, the undercarriage comprises a retraction cylinder which makes it possible on the one hand to take the undercarriage in or out of a compartment and, on the other hand, to keep the landing gear leg of the undercarriage in position when this landing gear leg is out of the compartment, independently of the horizontal stresses exerted on the landing gear leg.

In addition, a retraction cylinder is usually furnished with a retraction chamber and an extension chamber and a piston sliding in a cylindrical sheath, the retraction and extension chambers being separated by the head of the piston.

Furthermore, the retraction and extension chambers are connected to a hydraulic circuit.

To retract the landing gear leg, a control member of the rotorcraft injects a fluid, oil for example, into the retraction chamber through a retraction port. The pressure exerted by this fluid on the piston head causes this piston to retract.

Furthermore, since the piston is articulated on the landing gear leg, a retraction of the piston causes a rotary movement of this landing gear leg and therefore causes it to retract into the rotorcraft compartment provided for this purpose.

Conversely, in order to take out the landing gear leg, a control member of the rotorcraft injects a fluid into the extension chamber, through an extension port, so that the piston can come out of the body of the cylinder in order to push the landing gear leg out of the compartment.

Furthermore, when the landing gear leg is in the desired position, the retraction and extension ports are locked, via a solenoid valve for example.

The pressures exerted by the fluid in the retraction and extension chambers are then maintained at a constant value, because of the hydraulic locking achieved with the aid of the solenoid valves, which immobilises the position of the piston.

When the landing gear leg is out, this landing gear leg will sustain a horizontal stress when encountering an obstacle, a stone for example, which is necessarily transferred to the retraction cylinder.

Since the piston is locked, this piston cannot move and then damp the horizontal stress sustained by the undercarriage.

Note that this first type of undercarriage is very common in the aviation field since it satisfies the needs during flights operating in normal conditions.

Nevertheless, in the event of a failure of the rotorcraft, it is possible that the vertical speed of this rotorcraft, for example in autorotation, namely very high, this vertical speed then greatly exceeding normal landing speeds.

It is noted that the damper of the undercarriage no longer makes it possible to damp the impacts due to the impact of the undercarriage on the ground, the power of vertical shock absorption of the undercarriage then being exceeded.

It is easy to understand that this situation may lead to unfortunately catastrophic events, the undercarriage no longer being able to respond to the needs notably in the case of a crash of the rotorcraft.

To remedy this, it is conceivable to design the damper in order to allow it to withstand extreme vertical stresses. However, the space requirement of the damper, its weight and its cost then become prohibitive.

Document FR2608242 describes a second type of rocker-beam undercarriage furnished with a landing gear leg attached to the structure of the rotorcraft.

In addition, the undercarriage is henceforth provided not with a damper and a retraction cylinder but with a damper-cylinder.

The damper-cylinder is substantially perpendicular to the ground, while the landing gear leg is substantially parallel to the ground when this landing gear leg is retracted into a compartment of the rotorcraft.

The damper-cylinder then fulfils the functions of a conventional damper but also those of a retraction cylinder, the damper-cylinder finally comprising a retraction cylinder sliding in a damper.

This second type of undercarriage is practical because of its simplicity but may have the same disadvantages as the undercarriage of the first type.

In addition, it is noted that it is not possible to arrange a damper-cylinder on the first type of undercarriage.

Specifically, if the damper of the first type of undercarriage is replaced by the damper-cylinder, it will be appropriate to retain the retraction cylinder in order to retract the landing gear. Since the damper-cylinder is incorporated into the landing gear leg, this damper-cylinder cannot retract this leg.

Furthermore, if the retraction cylinder of the first type of undercarriage is replaced by the damper-cylinder of the second type of undercarriage, the situation will remain unchanged. The damper-cylinder will be able to retract the landing gear leg but will have no impact-damping function during a high-speed landing because this damper-cylinder is stressed only horizontally.

However, document FR 2687123 provides a solution to solve the latter disadvantage.

The landing gear leg of the undercarriage is then fitted with a wheel whose spindle, that is to say the rotation shaft of the wheel, is offset relative to the longitudinal axis of the landing gear leg.

In addition, the landing gear leg is furnished with a damper-cylinder comprising both a retraction cylinder and a damper.

The vertical stresses sustained by the landing gear leg then generate a torque which tends to retract this landing gear leg.

However, the damper-cylinder is then designed so that the said torque is less than the stresses that can be absorbed by this damper-cylinder.

Consequently, to be able to be effective in the case of a crash of the rotorcraft, the damper-cylinder would have to be designed to withstand extreme horizontal stresses which would make its space requirement, its weight and its cost prohibitive.

In addition, it is relatively difficult to perfect a damper-cylinder comprising in series a retraction cylinder and a damper.

OBJECTS AND SUMMARY OF THE INVENTION

The object of the present invention is to propose a retraction cylinder allowing an anti-crash undercarriage to be free of the abovementioned limitations, while fulfilling in an unexpected manner a damping function during a high-speed landing since this retraction cylinder is not subjected to vertical stresses, the retraction cylinder therefore alleviating the limits of the undercarriage damper.

According to the invention, a retraction cylinder making it possible to retract a leg of a rotorcraft landing gear, comprises a retraction chamber and an extension chamber separated by a head of a piston, this piston sliding in a cylindrical sheath.

In addition, this retraction cylinder is notable in that it comprises a return means and a control chamber filled with a first fluid, this control chamber being separated from the return means by a movable release member, this movable release member sliding so that the retraction cylinder fulfils a damping function when a control pressure exerted by the first fluid on the movable release member is greater than a return pressure exerted by the return means.

Consequently, when the control pressure is greater than the return pressure, the movable release member of the retraction cylinder moves to transform the retraction cylinder into a damper.

In addition, the retraction cylinder is furnished with a hydraulic pipe which connects the control chamber to a compression chamber of a damper arranged on a rotorcraft landing gear leg.

Therefore, during a landing carried out at high speed, the damper of the undercarriage will have to minimize vertical stresses.

It will be seen below that, after a certain stage, the damper will no longer be able to fulfill its function and will transform the retraction cylinder into a damper by allowing the movement of the movable release member of the retraction cylinder.

Contrary to the existing prejudices, the retraction cylinder according to the invention may then damp the vertical stresses even if this retraction cylinder does not sustain such stresses.

According to a first embodiment, the return means is a preloaded spring.

According to a second embodiment, the return means comprises a pressurized chamber filled with a second fluid.

Preferably, the retraction cylinder is furnished with a means for adjusting the return pressure exerted by the said second fluid filling the said pressurized chamber.

Furthermore, the cylindrical sheath is advantageously provided with a plurality of radial bores placed along the length of this cylindrical sheath.

According to another variant of the invention, the radial bores are made in a helix. Therefore, a given point of the piston of the retraction cylinder does not pass all the bores, which spectacularly reduces the wear of the piston.

Similarly, since the movable release member, which surrounds the outer periphery of the cylindrical sheath, is furnished with a cylindrical tube, this cylindrical tube comprises a plurality of openings. These openings are then placed in view of the radial bores of the cylindrical sheath when the control pressure exerted by the first fluid on the movable release member is greater than a return pressure exerted by the return means.

In addition, the retraction cylinder is advantageously furnished with a channel placing its retraction and extension chambers in communication when the openings of the cylindrical tube are opposite the radial bores.

In these conditions, when the pressure exerted by the first fluid in the control chamber increases and exceeds the return pressure, the movable release member moves axially, that is to say along the axis of symmetry of the piston of the retraction cylinder.

This translation movement of the movable release member makes it possible to place the radial bores of the cylindrical sheath opposite the openings of the movable release member.

The retraction chamber of the retraction cylinder then communicates with its extension chamber by means of the channel which leads to the openings of the movable release member.

The piston of the retraction cylinder may then move and enter the body of the retraction cylinder. By moving along its axis of symmetry, the piston obstructs the radial bores one after the other.

Consequently, the third fluid contained in the extension chamber of the retraction cylinder escapes less and less quickly from this extension chamber which generates a damping action due to the throttling of the third fluid through the holes, the damping action becoming greater as the piston penetrates inside the body of the retraction cylinder.

The movement of the movable release member therefore allows the retraction cylinder to fulfill a damping function from a given threshold corresponding to the return pressure.

In addition, the retraction cylinder is furnished with a hydraulic compensation chamber connected to the retraction chamber via a hydraulic passageway.

This hydraulic chamber prevents a blockage of the piston. Specifically, during the retraction of the piston, the third fluid travels from the extension chamber to the retraction chamber. Since the retraction chamber cannot accept the totality of the third fluid moved, notably because of the presence of a piston rod, the retraction cylinder comprises a compensation chamber to which the third fluid moves.

Advantageously, the movable release member being furnished with a cylindrical tube, this cylindrical tube comprises at least one radial drill hole which is in view of the hydraulic passageway of the hydraulic compensation chamber when the control pressure exerted by the first fluid on the movable release member is greater than a return pressure exerted by the return means. Conversely, when the control pressure exerted by the first fluid on the movable release member is less than the return pressure exerted by the return means, then the said radial drill hole of the cylindrical tube is no longer opposite the hydraulic passageway, the cylindrical tube then closing off this hydraulic passageway.

Finally, the retraction cylinder is advantageously furnished with a pneumatic compensation chamber separated from the hydraulic compensation chamber by a divider, an elastomer membrane for example.

This pneumatic compensation chamber then makes it possible to adapt the volume of the hydraulic compensation chamber to the situation.

Furthermore, a further subject of the invention is an anti-crash rocker-beam retractable undercarriage furnished with a retraction cylinder according to the invention.

Such a rotorcraft anti-crash retractable undercarriage comprises a landing gear leg fitted with a rolling assembly and a damper.

The undercarriage is notable in that, a retraction cylinder according to the invention being attached to the landing gear leg in order to retract it, the damper controls the retraction cylinder when the rotorcraft lands at a speed greater than a predetermined speed in order that the retraction cylinder unexpectedly fulfils a damping function.

If necessary, in order for the retraction cylinder to fulfill a damping function, the damper controls the retraction of the retraction cylinder when a vertical stress of this damper exceeds a predetermined limit, this vertical stress being substantially directed in a direction perpendicular to the ground.

Consequently, during a high-speed landing, once out of its compartment, the damper is substantially vertical, that is to say substantially vertical to the ground, while the retraction cylinder is at an angle with this damper.

Under the effect of the impact generated by the landing, the damper retracts. However, if the vertical stress exerted on the damper is greater than a predetermined limit, this damper cannot absorb the totality of the energy released by the impact.

The damper then controls the retraction cylinder so that this retraction cylinder can in its turn damp the vertical stresses exerted on the landing gear leg.

This configuration is very specific and surprising since the undercarriage will finally damp the stresses, originally vertical, with the aid of an item of equipment, the retraction cylinder, which should not sustain the said stresses.

Consequently, the retraction cylinder comprises a control chamber connected to a compression chamber of the damper via a hydraulic pipe. Note that the retraction cylinder and the damper are two separate items of equipment connected via a pipe and therefore do not constitute a damper-cylinder as described by the prior art and notably document FR2608242.

During a landing, the damper will retract, the pressure prevailing in the compression chamber and in the control chamber increasing in consequence.

In addition, the retraction cylinder being furnished with a return means, this retraction cylinder comprising a movable release member separating the control chamber from the return means. This return means holds the movable release member against a stop of the retraction cylinder while the damper is not vertically stressed beyond a predetermined limit.

Finally, since the retraction cylinder comprises a piston attached to the landing gear leg which slides in a cylindrical sheath furnished with radial bores, the movable release member being furnished with a cylindrical tube, the cylindrical tube comprises a plurality of openings designed to be opposite the radial bores when a vertical stress of the damper exceeds a predetermined limit.

Furthermore, the landing gear leg being attached to a structure of the rotorcraft via an attachment, the rolling assembly being furnished with at least one wheel rotating about an axis of rotation, this axis of rotation is offset relative to an axis of attachment perpendicular to the ground passing through the attachment.

According to a first variant of the invention, the rolling assembly of the undercarriage is furnished with at least one wheel offset relative to the longitudinal axis of the landing gear leg.

According to a second variant of the invention, the landing gear leg is attached to a structure of the rotorcraft via an attachment, this attachment being offset relative to the longitudinal axis of the landing gear leg.

BRIEF DESCRIPTION OF THE DRAWINGS

The invention and its advantages will appear in greater detail in the context of the following description with exemplary embodiments given as illustrations with reference to the appended figures which represent:

FIG. 1, a schematic view of an undercarriage when the rotorcraft is landed on the ground, FIG. 2, a schematic view of an undercarriage retracted into its compartment, FIG. 3, a schematic view of an undercarriage during a high-speed landing of the rotorcraft, FIG. 4, a section of a retraction cylinder according to the invention, and FIG. 5, a schematic view of a variant of an undercarriage according to the invention.

The elements present in several separate figures are allocated one and the same reference.

MORE DETAILED DESCRIPTION

FIG. 1 shows a schematic view of a rotorcraft undercarriage 2, the rotorcraft being landed on the ground.

This undercarriage 2 comprises a landing gear leg 10 of which one fixed end 10' is articulated on a structure 3 of the rotorcraft via an attachment 11. Conversely, the free end 10" of the landing gear leg 10 is furnished with a rolling assembly 12 provided with a wheel which rests on the ground S.

Between this fixed end 10" and free end 10", the landing gear leg comprises a damper 14 making it possible to dissipate the vertical forces sustained by the landing gear leg 10 during a landing of the rotorcraft.

Note that the longitudinal axis AX of the landing gear leg 10 is substantially perpendicular to the ground S when the rotorcraft has landed.

Furthermore, the undercarriage 2 is provided with a retraction cylinder 20 separate from the damper 14.

The retraction cylinder 20 comprises a first end 20' articulated inside a compartment 1, in which the undercarriage 2 is contained in flight, while its second end 20" is articulated on the landing gear leg 10.

The particular purpose of this retraction cylinder 20 is to retract the landing gear leg 10 in flight so that this landing gear leg 10 re-enters its compartment 1, according to FIG. 2.

Specifically, when the rotorcraft has taken off, it is no longer necessary to keep the undercarriage in position "landing gear out". Consequently, the rotorcraft controls the retraction cylinder 20. The latter then retracts, which causes a rotation of the landing gear leg 10 about its attachment 11.

The undercarriage 2 is consequently stored in the compartment 1 and is in the "landing gear in" position.

Similarly, the retraction cylinder 20 makes it possible to take the landing gear leg 10 out of the compartment 1 at the time of landing. A control member of the rotorcraft then controls the retraction cylinder 20 so that this retraction cylinder 20 extends in order to take the landing gear leg 10 out of the compartment 1.

Furthermore, once the landing gear leg 10 is out, the retraction cylinder 20 holds it in this "landing gear out" position so that the landing gear leg does not retract without just cause, which would irremediably lead to an accident.

However, with reference to FIG. 1, the retraction cylinder 20 is connected to the compression chamber 15 of the damper 14 by a hydraulic pipe 21 of the retraction cylinder 20.

When the rotorcraft lands at an exceptionally high speed, in the case of a crash of the rotorcraft for example, the damper 14 may reach the maximum limit of its possibilities, this damper 14 no longer being able to dissipate the totality of the vertical stresses to which the landing gear leg 10 is subjected.

When the speed of landing is greater than a predetermined speed, of 3 to 4 metres per second for example, for which the damper 14 is designed, this damper 14 will control the retraction cylinder 20 via the hydraulic pipe 21 so that this retraction cylinder 20 participates in the absorption of the said vertical stresses.

Consequently, when the vertical stresses exerted on the landing gear leg 10 exceed a predetermined limit that can be absorbed by the damper 14, the damper 14 controls the retraction cylinder 20. With reference to FIG. 3, the landing gear leg 10 will make a rotary movement in the direction of the arrow F, this movement nevertheless being damped by the retraction cylinder 20.

It is important to specify that the retraction of the landing gear leg 10 is partial, this landing gear leg 10 not re-entering totally into the compartment 1 since it is retarded and finally stopped by the retraction cylinder 20.

Specifically, the damper 14 releases the retraction cylinder 20 so that the latter no longer holds the landing gear leg 10 in the "landing gear out" position. The vertical stresses exerted on this landing gear leg 10 then cause it to rotate about the attachment 11.

The vertical stresses that are not absorbed by the damper 14 are therefore transformed into substantially horizontal stresses exerted on the retraction cylinder 20, this retraction cylinder temporarily becoming a damper.

It is well understood that the retraction cylinder does not comprise a damping system arranged in series with a retraction system. The retraction cylinder 20 is therefore not a damper-cylinder but a retraction cylinder which will on occasion fulfill a damping function by being controlled by the damper 14 of the landing gear leg 10.

Consequently, the method applied by the invention consists in damping the substantially vertical stresses exerted on a landing gear leg of a rotorcraft undercarriage, by using a retraction cylinder 20 that is able to be controlled by the damper 14 of the landing gear leg 10.

When the speed of the rotorcraft exceeds a predetermined speed, the vertical stresses exerted on the landing gear leg exceed a predetermined limit. Depending on the method applied, the damper 14 therefore controls the retraction cylinder 20 so that the latter fulfils a damping function, this retraction cylinder 20 finally becoming a damper temporarily.

Once the impact due to landing is absorbed, the undercarriage may then return to its initial position, namely the "landing gear out" position.

To optimize the method applied by the undercarriage 2, the rolling assembly 12 being furnished with at least one wheel 13 rotating about an axis of rotation AR, this axis of rotation AR is offset relative to an axis of attachment AF perpendicular to the ground and passing through the attachment 11 of the landing gear leg 10.

Specifically, the stresses exerted on the landing gear leg 10 are substantially vertical but nevertheless are often at a slight angle, these stresses, although called "vertical", no longer being strictly perpendicular to the ground. This configuration may occur depending on the trajectory of the rotorcraft or even of the slope presented by the ground S.

In these conditions, the landing gear leg 10 naturally tends to rotate about the attachment 11 when the damper 14 reaches its maximum limit.

However, it is possible to envisage a configuration for which the position of the longitudinal axis AX relative to the ground and the direction of the vertical stresses exerted on the landing gear leg do not lead to a rotation of this landing gear leg 10. It is notably the case if the ground is perfectly horizontal, if the axis of rotation AR of the wheel 13 and the attachment 11 of the landing gear leg 10 are situated on one and the same axis perpendicular to the ground S and if the vertical stresses exerted on the landing gear leg 10 are also perpendicular to the ground S.

Therefore, by offsetting the axis of rotation AR of the wheel 13 relative to the axis of attachment AF passing through the attachment 11, such a situation which could lead to an accident is avoided.

According to the variant represented in FIG. 1, the attachment 11 is offset relative to the longitudinal axis AX of the landing gear leg and relative to the axis of rotation AR of the wheel 13.

According to another variant represented in FIG. 5, it is the axis of rotation AR of the wheel 12 that is offset relative to the longitudinal axis AX of the landing gear leg and relative to the axis of attachment AF.

FIG. 4 shows a section of a retraction cylinder 20 according to the invention attached to a damper 10 of a landing gear leg via an articulation 32.

This retraction cylinder is furnished with a retraction chamber 33 separated from an extension chamber 34 by the head 26 of a piston 25.

This piston 25 is also provided with a rod 27 attached to the damper 14 via the articulation 32.

In addition, the piston 25, more particularly its head 26, slides in a cylindrical sheath 35 which also partially surrounds the retraction chamber 33 and extension chamber 34.

It is observed that the cylindrical sheath 35 comprises a plurality of radial bores placed along the length of this cylindrical sheath 35, namely in a longitudinal direction relative to this cylindrical sheath 35.

Furthermore, the retraction and extension of the retraction cylinder 20 are controlled by a control member of the rotorcraft, more precisely via the action of the pilot who uses this control member not shown.

In order to retract the retraction cylinder, the control member injects a third fluid, oil for example, into a retraction port 28 of the retraction cylinder 20.

The pressure in the retraction chamber 33 increases, which induces a movement of the piston 25 in the direction of the arrow F1. This piston 25 therefore penetrates the body of the retraction cylinder 20.

This retraction cylinder 20 therefore retracts and returns the landing gear leg into its compartment, the undercarriage being in the "landing gear in" position.

The piston 25 being moved, the extension chamber empties, the third fluid escaping via the extension port 29 and the pipe 30'.

Conversely, in order to take the landing gear leg out, the control member injects a third fluid into the pipe 30'. This third fluid then penetrates an extension port 29 of the retraction cylinder 20.

The pressure in the extension chamber 34 increases, which induces a movement of the piston 25 in the direction of the arrow F2. This piston 25 therefore comes out of the body of the retraction cylinder 20.

This retraction cylinder 20 then extends and moves the landing gear leg out of its compartment, the undercarriage being in the "landing gear out" position.

The piston 25 having been moved, the retraction chamber empties, the third fluid escaping via the retraction port 28 and the pipe 30.

When the undercarriage is in the "landing gear out" position, the control member blocks the hydraulic circuit supplying the retraction port 28 and extension port 29 via valves (not shown).

The pressures of the third fluid prevailing in the retraction chamber 33 and extension chamber 34 are then fixed, which holds the landing gear leg in the "landing gear out" position.

It is well understood that, by proceeding in an identical manner, the control member may hold the landing gear leg in the "landing gear in" position.

Furthermore, the retraction cylinder 20 comprises a control chamber 22 filled with a first fluid, the said control chamber being annular and therefore arranged about the cylindrical sheath 35 in which the head 26 of the piston 25 slides. This control chamber 22 is separated from a return means 23 by a movable release member 24.

In normal conditions, the return means exerts a return pressure on the movable release member 24 so that this movable release member 24 is locked against a stop 43.

According to a first embodiment not shown, the return means is a preloaded spring.

With reference to FIG. 4, according to a second embodiment, the return means comprises a pressurized chamber 23 filled with a second fluid, this pressurized chamber 23 being annular and placed around the cylindrical sheath 35 in which the head 26 of the piston 25 slides. A regulating means 40 then makes it possible to regulate the return pressure exerted by the second fluid.

In addition, the movable release member 24 consists of a cylindrical tube 24', which notably surrounds the outer periphery 41 of the cylindrical sheath 35, and a lip 24''' perpendicular to this cylindrical tube 24', the lip 24''' separating the control chamber 22 from the return means 23.

The cylindrical tube 24' then comprises a top portion 61 situated above the lip 24''', more precisely to the right of this lip 24''' in FIG. 4, and a bottom portion 60 situated beneath the lip 24''', more precisely to the left of this lip 24''' in FIG. 4.

The cylindrical tube 24' is then advantageously furnished with radial openings 24'', in its top portion 61, arranged along the length of this cylindrical tube 24'. It will be seen that these openings 24'' are capable of being positioned opposite the radial bores 35' of the cylindrical sheath 35 in extreme conditions.

Consequently, the undercarriage of the rotorcraft is fitted with a retraction cylinder 20 according to the invention.

In addition, this undercarriage comprises a damper 14 placed on the landing gear leg of the undercarriage.

The damper 14 is furnished with a long, thin element 16, such as a piston, which enters a casing 14'. The long, thin element 16 therefore obstructs a compression chamber 15 of the damper 14.

Note also that the compression chamber 15 is connected to the control chamber 22 of the retraction cylinder via a hydraulic pipe 21. Specifically, a first end zone of this hydraulic pipe 21 is attached to the outer fairing of the retraction cylinder in order to lead to the control chamber 22, while a second end zone of the hydraulic pipe 21 leads to the compression chamber 15 of the damper.

When the rotorcraft lands, the vertical stresses exerted on the landing gear leg push the long, thin element 16 which compresses the second fluid contained in the compression chamber 14 in order to absorb these stresses.

In normal conditions, the control pressure exerted by the second fluid in the control chamber 22 on the movable release member 24 increases but nevertheless remains below the return pressure exerted by the return means 23.

The movable release member 24 therefore remains locked against the stop 43.

However, when the damper 14 sustains a vertical stress exceeding a predetermined limit, in the case of a crash of the rotorcraft for example, the long, thin element 16 of the damper progresses rapidly inside the casing 14', this damper no longer being able to absorb the totality of the said vertical stress.

The first fluid filling the compression chamber is then transferred to the control chamber 22 of the retraction cylinder by the hydraulic pipe 21 of this retraction cylinder.

Consequently, the control pressure in the control chamber 22 increases rapidly until it becomes greater than the return pressure.

The return means 23 then can no longer lock the mobile release member which begins to slide along the cylindrical sheath 35. In this manner, the damper 14 mechanically orders the retraction cylinder to fulfill a damping function.

Hitherto, the cylindrical tube 24' of the movable release member 24 obstructed the radial bores of the cylindrical sheath.

However, the translation of this cylindrical tube 24' in fact causes a translation of the openings 24'' of the cylindrical tube 24, these openings 24'' now being opposite the radial bores.

Consequently, the extension chamber 34 of the retraction cylinder is no longer hermetically closed, sections of leakage being generated by the openings 24'' being aligned on the radial bores 35'.

The retraction cylinder is then no longer hydraulically locked. The landing gear leg therefore begins to tilt around its attachment 11, the vertical stresses that it sustained being transformed into horizontal stresses exerted on the retraction cylinder.

The retraction cylinder comprising a channel 36, into which the top portion 61 of the cylindrical tube 24' leads, the third fluid contained in the extension chamber 34 follows the radial bores 35' then the openings 24'' and the channel 36 in order to travel into the retraction chamber 33.

The movement of the third fluid into the radial bores 35' and the openings 24'' generates a throttling of this third fluid which induces a damping of the horizontal stresses.

Note that, by moving in the direction of the arrow F1, the piston progressively obstructs the radial bores 35'. The section of leakage of the third fluid therefore reduces with the progression of the piston which means that the damping is also progressive, becoming gradually greater.

Consequently, the movement of the landing gear leg is rapidly stopped, the damping being carried out gently.

Therefore, being controlled by the damper 14, the retraction cylinder 20 is transformed into a damper and actively participates in the absorption of the vertical stresses sustained by the landing gear leg during a landing taking place at a high speed exceeding a predetermined speed.

In addition, it is noted that the rod 27 of the piston reduces the volume of the retraction chamber 33, such a reduction not being present in the extension chamber.

It is therefore worthwhile to compensate for this reduction.

Consequently, the retraction cylinder is furnished with a hydraulic compensation chamber 33 connected to the retraction chamber 37 via a hydraulic passageway 42.

In addition, the movable release member 24 being furnished with a cylindrical tube 24', this cylindrical tube 24' comprises a radial drill hole 50, in its bottom portion 60, which is opposite the hydraulic passageway 42 of the hydraulic compensation chamber when the control pressure exerted by the first fluid on the movable release member 24 is greater than the return pressure exerted by the return means 23. Conversely, when the control pressure exerted by the first fluid on the movable release member 24 is less than the return pressure exerted by the return means 23, the said radial drill hole 50 of the cylindrical tube is no longer opposite the hydraulic passageway 42, the cylindrical tube then obstructing this hydraulic passageway 42.

The hydraulic compensation chamber 37 is therefore open only in particular conditions, namely when the movable release member 24 moves under the effect of the control pressure prevailing in the control chamber.

Therefore, when the control pressure is greater than the return pressure exerted by the return means 23, the movable release member moves so as to place these openings 24" and its radial drill hole 50 respectively opposite the radial bores 35' and the hydraulic passageway 42. When the piston 25 penetrates the extension chamber 34, the third fluid contained in the extension chamber 34 then travels through the channel 36 in order to go to the retraction chamber and then enters the hydraulic compensation chamber 37 via the hydraulic passageway 42 and the radial drill hole 50.

Note that this third fluid does not escape via the retraction port 28 because the rotorcraft obstructs the pipe 30 by usual means not shown. Specifically, the pipes 30 and 30' are opened only by the said means when the rotorcraft controls the extension or retraction of the retraction cylinder 20.

In addition, in order to be able to lead to the inside of the hydraulic compensation chamber 37, the bottom portion 60 of the cylindrical tube 24' partially traverses the retraction chamber 33. Consequently, this bottom portion 60 of the cylindrical tube comprises a slot 51 so that the cylindrical tube 24' does not split the retraction chamber 33 into two distinct chambers.

In addition, the retraction cylinder is provided with a pneumatic compensation chamber 38 separated from the hydraulic compensation chamber by a divider 39. This divider makes it possible to prevent the fourth fluid, air or nitrogen for example, contained in the pneumatic compensation chamber from mixing with the third fluid, because of their respective density.

Gradually, as the piston 25 progresses, the pressure of the third fluid in the hydraulic compensation chamber 37 increases, which causes a movement of the divider 39, to the extent that the pressure of the fourth fluid in the pneumatic compensation chamber 38 is lower than the pressure of the third fluid in the hydraulic compensation chamber 37.

Therefore, the volume of the hydraulic compensation chamber 37 increases, this hydraulic compensation chamber 37 therefore being able to accept the third fluid originating from the extension chamber 34.

Naturally, the present invention is subject to many variations when applied. Although several embodiments have been described, it is clearly understood that it is inconceivable to identify exhaustively all the possible embodiments. It is of course possible to envisage replacing a means described by an equivalent means without departing from the context of the present invention.

What is claimed is:

1. Retraction cylinder (20) for retracting a leg (10) of a rotorcraft landing gear, the said retraction cylinder (20) comprising a retraction chamber (33) and an extension chamber (34) separated by a head (26) of a piston (25), the said piston (25) sliding in a cylindrical sheath (35) having a plurality of radial bores (35') placed along the length of the cylindrical sheath (35), wherein a return means (23) and a control chamber (22) filled with a first fluid, the said control chamber (22) being separated from the said return means (23) by a movable release member (24), the said movable release member (24) sliding so that the retraction cylinder (20) fulfills a damping function when a control pressure exerted by the said first fluid on the said movable release member (24) is greater than a return pressure exerted by the said return means (23), and in that the said retraction cylinder (20) is furnished with a hydraulic pipe (21) capable of connecting the said control chamber (22) to a compression chamber (15) of a damper (14) arranged on a rotorcraft landing gear leg (10).

2. Retraction cylinder according to claim 1, characterized in that the said return means is a preloaded spring.

3. Retraction cylinder according to claim 1, characterized in that the said return means comprises a pressurized chamber (23) filled with a second fluid.

4. Retraction cylinder according to claim 3, wherein said cylinder is furnished with a means (40) for adjusting the return pressure exerted by the said second fluid filling the said pressurized chamber (23).

5. Retraction cylinder according to claim 1, characterized in that the said movable release member (24) surrounds the outer periphery (41) of the said cylindrical sheath (35).

6. Retraction cylinder according to claim 1, characterized in that the said movable release member (24) being furnished with a cylindrical tube (24'), the said cylindrical tube (24') comprises a plurality of openings (24") placed opposite the said radial bores (35') when the control pressure exerted by the said first fluid on the said movable release member (24) is greater than a return pressure exerted by the said return means (23).

7. Retraction cylinder according to claim 6, wherein said cylinder is furnished with a channel (36) placing the said retraction chamber (33) and extension chamber (34) in communication when the openings (24") of the cylindrical tube (24') are opposite the radial bores (35').

8. Retraction cylinder according to claim 7, wherein said cylinder is furnished with a hydraulic compensation chamber (37) connected to the retraction chamber (33) via a hydraulic passageway (42).

9. Retraction cylinder according to claim 8, characterized in that, the said movable release member (24) being furnished with a cylindrical tube (24'), this cylindrical tube (24') comprises at least one radial drill hole (50) which is opposite the said hydraulic passageway (42) of the hydraulic compensation chamber (37) when the control pressure exerted by the first fluid on the movable release member (24) is greater than a return pressure exerted by the return means (23).

10. Retraction cylinder according to claim 8, wherein said cylinder is furnished with a pneumatic compensation chamber (38) separated from the said hydraulic compensation chamber (37) by a divider (39).

11. Rotorcraft anti-crash retractable undercarriage (2) comprising a landing gear leg (10) fitted with a rolling assembly (12) and a damper (14), characterized in that, a retraction cylinder (20) according to any one of the preceding claims being attached to the said landing gear leg (10) in order to retract it, the said damper (14) controls the said retraction cylinder (20) when the said rotorcraft lands at a speed greater than a predetermined speed in order that the retraction cylinder fulfills a damping function.

12. Undercarriage according to claim 11, characterized in that, in order for the retraction cylinder (20) to fulfill a damping function, the said damper (14) controls the retraction of the said retraction cylinder (20) when a vertical stress of this damper (14) exceeds a predetermined limit, the said vertical stress being directed in a direction substantially perpendicular to the ground.

13. Undercarriage according to claim 11, characterized in that, the said landing gear leg being attached to a structure of the rotorcraft via an attachment (11), the said rolling assembly (12) being furnished with at least one wheel (13) rotating about an axis of rotation (AR), the said axis of rotation (AR) is offset relative to an axis of attachment (AF) perpendicular to the ground passing through the said attachment (11).

14. Undercarriage according to claim 13, characterized in that the said rolling assembly (12) is furnished with at least one wheel (13) offset relative to the longitudinal axis (AX) of the said landing gear leg (10).

15. Undercarriage according to claim 13, characterized in that the said landing gear leg (10) is attached to a structure (3) of the rotorcraft via an attachment (11), the said attachment (11) being offset relative to the longitudinal axis (AX) of the said landing gear leg (10).

16. Undercarriage according to claim 15, characterized in that the said retraction cylinder (20) comprises a control chamber (22) connected to a compression chamber (15) of the said damper (14) via a hydraulic pipe (21).

17. Undercarriage according to claim 11, characterized in that, the said retraction cylinder (20) being furnished with a return means (23), this retraction cylinder (20) comprising a movable release member (24) separating the said control chamber (22) from the said return means (23), the said return means (23) holds the said movable release member (24) against a stop (43) of the said retraction cylinder (20) while the said damper (14) is not stressed vertically beyond a predetermined limit.

18. Undercarriage according to claim 11, characterized in that, the said retraction cylinder (20) comprising a piston (25) attached to the said landing gear leg (10) and sliding in a cylindrical sheath (35) furnished with radial bores (35'), the said movable release member (24) being furnished with a cylindrical tube (24'), the said cylindrical tube (24') comprises a plurality of openings (24") designed to be opposite the said radial bores (35') when a vertical stress of the damper exceeds a predetermined limit.

* * * * *